United States Patent [19]

Tanaka et al.

[11] Patent Number: 5,162,100
[45] Date of Patent: Nov. 10, 1992

[54] ALUMINUM-BASED BEARING ALLOY WITH EXCELLENT FATIGUE RESISTANCE AND ANTI-SEIZURE PROPERTY

[75] Inventors: Tadashi Tanaka, Konan; Masaaki Sakamoto, Nagoya; Koichi Yamamoto, Komaki; Yoshiaki Sato, Gifu; Tohru Kato, Seto, all of Japan

[73] Assignee: Daido Metal Company, Ltd., Nagoya, Japan

[21] Appl. No.: 750,338

[22] Filed: Aug. 27, 1991

[30] Foreign Application Priority Data

Aug. 31, 1990 [JP] Japan .................................. 2-228250

[51] Int. Cl.$^5$ ............................................ C22C 21/12
[52] U.S. Cl. .................................... 420/530; 148/416; 148/419; 148/438; 148/442; 420/535; 420/537; 420/538; 420/587; 428/650; 428/654
[58] Field of Search ............... 420/530, 587, 537, 538, 420/535; 148/416, 417, 418, 419, 438, 439, 442; 428/650, 654

[56] References Cited

U.S. PATENT DOCUMENTS 4,617,172 10/1986 Mori .................................. 420/530

FOREIGN PATENT DOCUMENTS 62-14024 3/1987 Japan .

Primary Examiner—R. Dean
Assistant Examiner—Robert R. Koehler
Attorney, Agent, or Firm—Browdy and Neimark

[57] ABSTRACT

An aluminum-based bearing alloy of the invention comprises 3–40% Sn, 0.1–10% Pb, 0.1–5% Cu, 0.1–3% Sb, total 0.05–1% of Ti and B which satisfy the equation: $B/Ti+B=0.1$ to $0.35$, and the balance being essentially Al. The aluminum-based bearing alloy according to the present invention has excellent fatigue resistance and anti-seizure property.

12 Claims, 4 Drawing Sheets

ALUMINUM-BASED BEARING ALLOY WITH EXCELLENT FATIGUE RESISTANCE AND ANTI-SEIZURE PROPERTY

BACKGROUND OF THE INVENTION

1. Field of the Invention

The present invention relates to an improvement of an aluminum-based bearing alloy containing tin, lead, copper and antimony.

2. Description of the Related Art

Conventional aluminum-based bearing alloys are disclosed in, for example, JP-B-62-14024. The composition of this alloy consists essentially of 3–40% tin (Sn), 0.1–10% lead (Pb), 0.2–5% copper (Cu), 0.1–3% antimony (Sb), 0.1–3% silicon (Si) and 0.01–3% of at least one element selected from the group consisting of manganese (Mn), vanadium (V), magnesium (Mg) and nickel (Ni).

These conventional alloys exhibit excellent fatigue resistance and anti-seizure property which are required for the slide bearing. However, high-speed and high-output internal combustion engines have recently been developed, and this has increased a demand for slide bearings which exhibit more excellent properties.

SUMMARY OF THE INVENTION

An object of the invention is to provide an aluminum-based bearing alloy which has more excellent fatigue resistance and anti-seizure property than similar kinds of the conventional bearing alloys.

This object of the present invention is achieved by the provision of the following aluminum-based bearing alloy which has excellent fatigue resistance and anti-seizure property.

a) An aluminum-based bearing alloy comprising 3–40% Sn, 0.1–10% Pb, 0.1–5% Cu, 0.1–3% Sb, total 0.05–1% of titanium (Ti) and boron (B), by weight, which satisfy the equation: $T_i + B^B = 1$ to 0.35, and the balance being essentially aluminum (Al).

b) The aluminum-based bearing alloy according to the paragraph a wherein the alloy further comprises 0.1–5% of Si.

c) The aluminum-based bearing alloy according to the paragraph a wherein the alloy further comprises total 0.01–3% of at least one element selected from the group consisting of Mg, Ni, V, Mn, zirconium (Zr), chromium (Cr) and iron (Fe).

d) The aluminum-based bearing alloy according to the paragraph a wherein the alloy further comprises 0.1–5% Si and total 0.01–3% of at least one element selected from the group consisting of Mg, Ni, V, Mn, Zr, Cr and Fe.

DETAILED DESCRIPTION OF THE INVENTION

Figure 1:
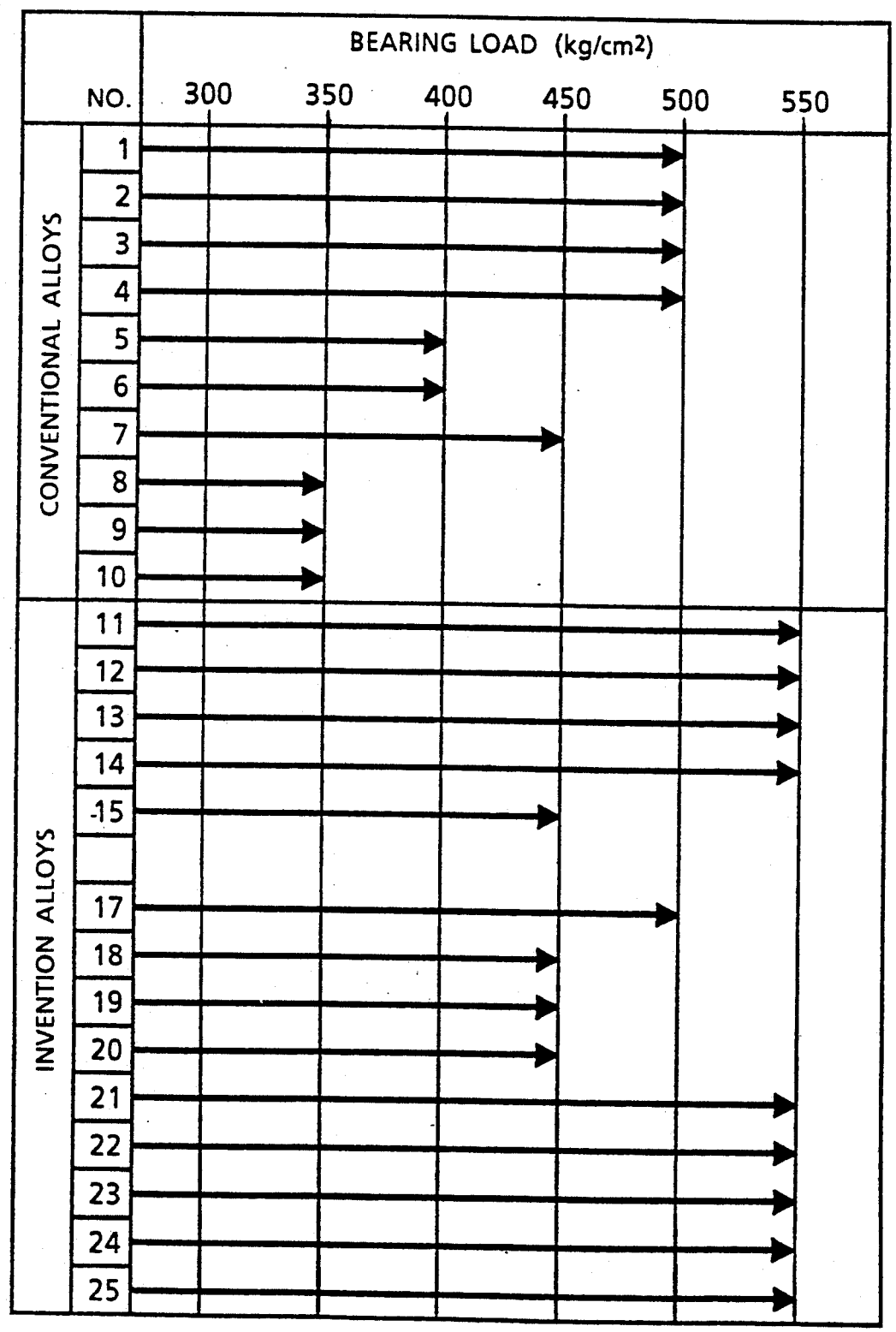
FIG. 1 is a graph showing the results of the fatigue test conducted on a composite bearing.

The aluminum-based bearing alloy of the invention has the aforementioned composition for the following reasons (reasons for the upper and lower limitations of the proportion).

a) Sn: 3–40% by weight

Tin in the alloy improves the surface performance of the bearing, such as anti-seizure property, conformability or embeddability. The presence of less than 3% of tin is insufficient to obtain the above mentioned advantages. The inclusion of more than 40% of tin greatly reduces the mechanical property of the alloy.

b) Pb: 0.1–10% by weight

Lead in the alloy improves anti-seizure property, machinability and affinity for lubricants of the bearing. The presence of less than 0.1% of lead is insufficient to obtain the above mentioned advantages. The addition of more than 10% of lead makes fine and uniform dispersion of lead in aluminum matrix very difficult.

c) Cu: 0.1–5% by weight

Copper in the alloy increases the mechanical strength of aluminum matrix and improves the mechanical properties, such as load resistance and fatigue resistance, of the bearing. The presence of less than 0.1% of copper is insufficient to improve the load and fatigue resistances of the alloy. The inclusion of more than 5% of copper greatly deteriorates the ductility as to reduce the plastic workability.

d) Sb: 0.1–3% by weight

Antimony in the alloy allows for fine and uniform dispersion of lead in aluminum matrix and improves the mechanical property of aluminum matrix. The presence of less than 0.1% of antimony is insufficient to obtain the above mentioned advantages. The addition of more than 3% of antimony is undesirable because it reduces elongation.

e) Ti and B: 0.05–1% by weight in total

The equation $T_i + B^B = 0.1$ to 0.35 must be satisfied.

The addition of titanium and boron produces hard intermetallic compound (Hv: 2500 to 3500) of $TiB_2$, which increases the strength of the alloy when uniformly dispersed. Since $TiB_2$ makes the micro structure of the alloy finer, there is no reduction in the elongation although the hardness of the alloy is increased. The presence of less than total 0.05% of titanium and boron is in sufficient to attain the above-mentioned advantages. The addition of more than total 1% of titanium and boron increases the brittleness and thus deteriorates the plastic workability of the alloy. In the alloy system of the invention which contains relatively many alloying elements, if the value of $T_i + B^B$ is smaller than 0.1, the effect of addition of titanium and boron cannot be discerned. On the other hand, if the value of $T_i + B^B$ is larger than 0.35, the compound of $TiB_2$ is not formed.

f) Si: 0.1–5% by weight

Silicon contributes to increasing the strength of matrix, particularly, improving the creep resistance of the alloy, within the range in which silicon dissolve in aluminium matrix to form solid solution. In the case where silicon particles crystallize, the soft aluminum matrix in the surface layer of the alloy member wears when the member is in sliding contact with a mating member and thereby the surface of the alloy member becomes to be irregular microscopically. The silicon particles rised on the surface of the alloy member withstand the sliding load, while recessions serve as oil reservoirs. These bring the alloy improvement in the anti-seizure property. Scattered fine silicon particles polish projections or burrs on the surface, which has usually a number of fine projections, of a shaft (particularly, a cast iron shaft) as the mating member. However, in the case of the steel shaft, if the alloy contains excessive silicon, the alloy member demages the shaft. Less than 0.1% of silicon in the alloy is insufficient to obtain the above mentioned effects. The presence of more than 5% of silicon increases the brittleness of the alloy and thereby the plastic workability of the alloy member is deteriorated.

g) At least one element selected from the group consisting of Mg, Ni, V, Mn, Zr, Cr and Fe: total 0.01-3% by weight Less than total 0.01% of the element(s) is insufficient to improve the fatigue and load resistances of the alloy. The presence of more than total 3% of the element(s) makes the alloy brittle.

EXAMPLE

Figure 4:
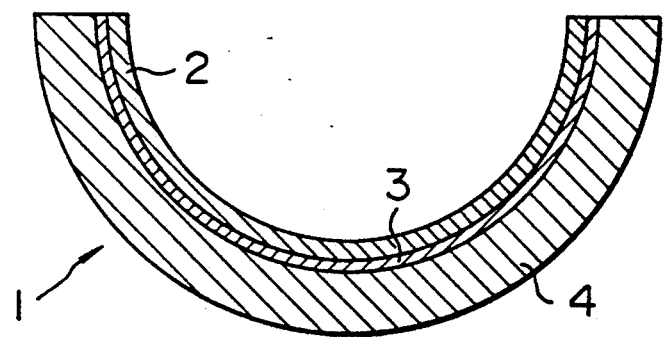
FIG. 4 is a sectional view of one example of the half shell bearing.

Strips were prepared from the invention alloys and conventional alloys of the chemical compositions shown in Table 1. Each of the strips was stacked on the top of a steel plate via an aluminum intermediate layer, and each of the stacks were passed through a rolling mill, respectively, to roll-bond it. Then each of the roll-bonded stacks was formed into a half shell bearing (composite bearing) having an inner diameter of 53 mm, a width of 17 mm and a lining (bearing alloy layer) thickness of 0.3 mm by a bearing forming machine. The half shell bearing 1 is a sliding bearing which consists of a sliding surface layer 2 made of the invention alloy, an intermediate layer 3 made of aluminum and a backing metal layer 4 made of steel (see FIG. 4).

Figure 2:
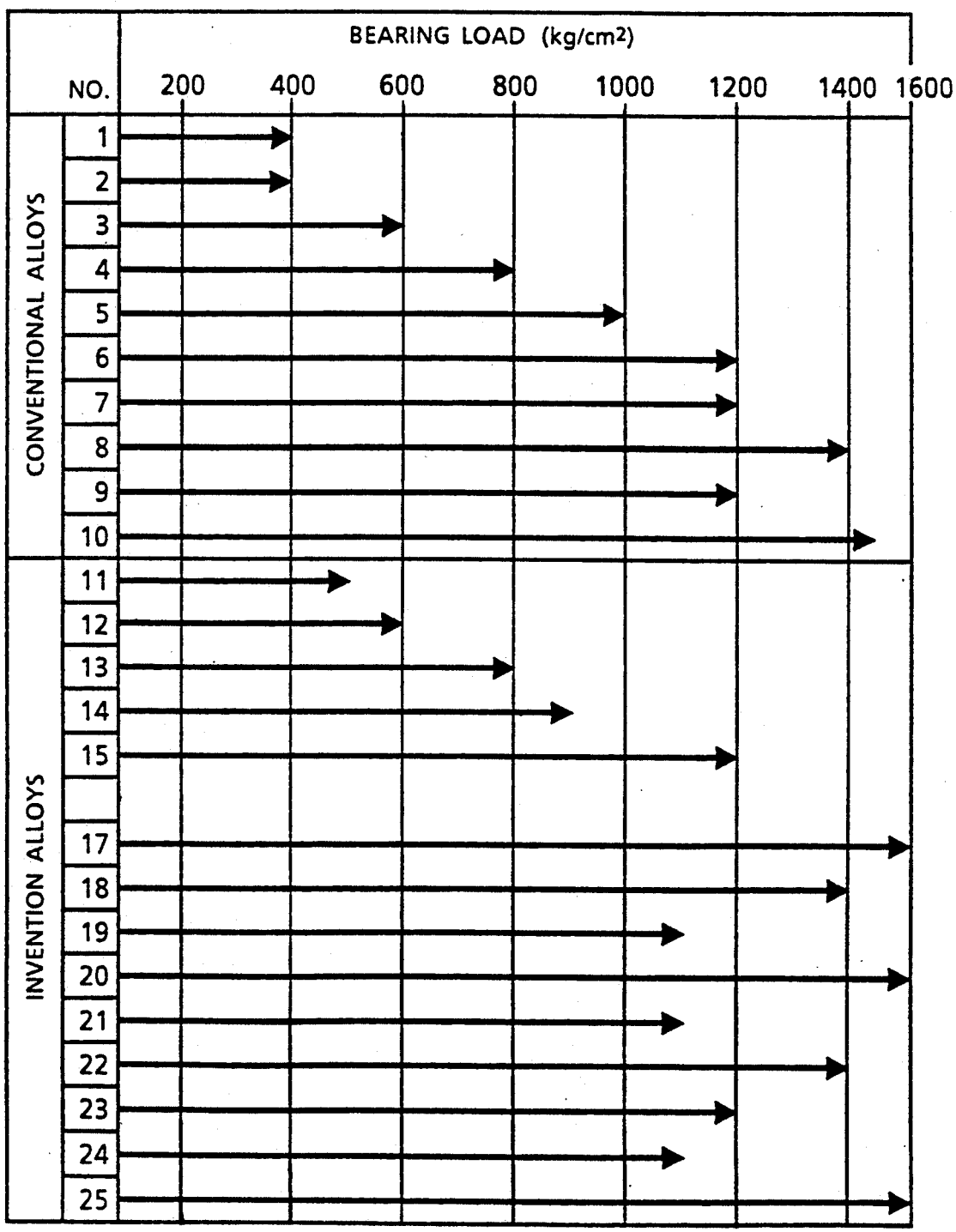
FIG. 2 is a graph showing the results of the seizure test made on a composite bearing, in which a steel shaft was used as a mating sliding member.
Figure 3:
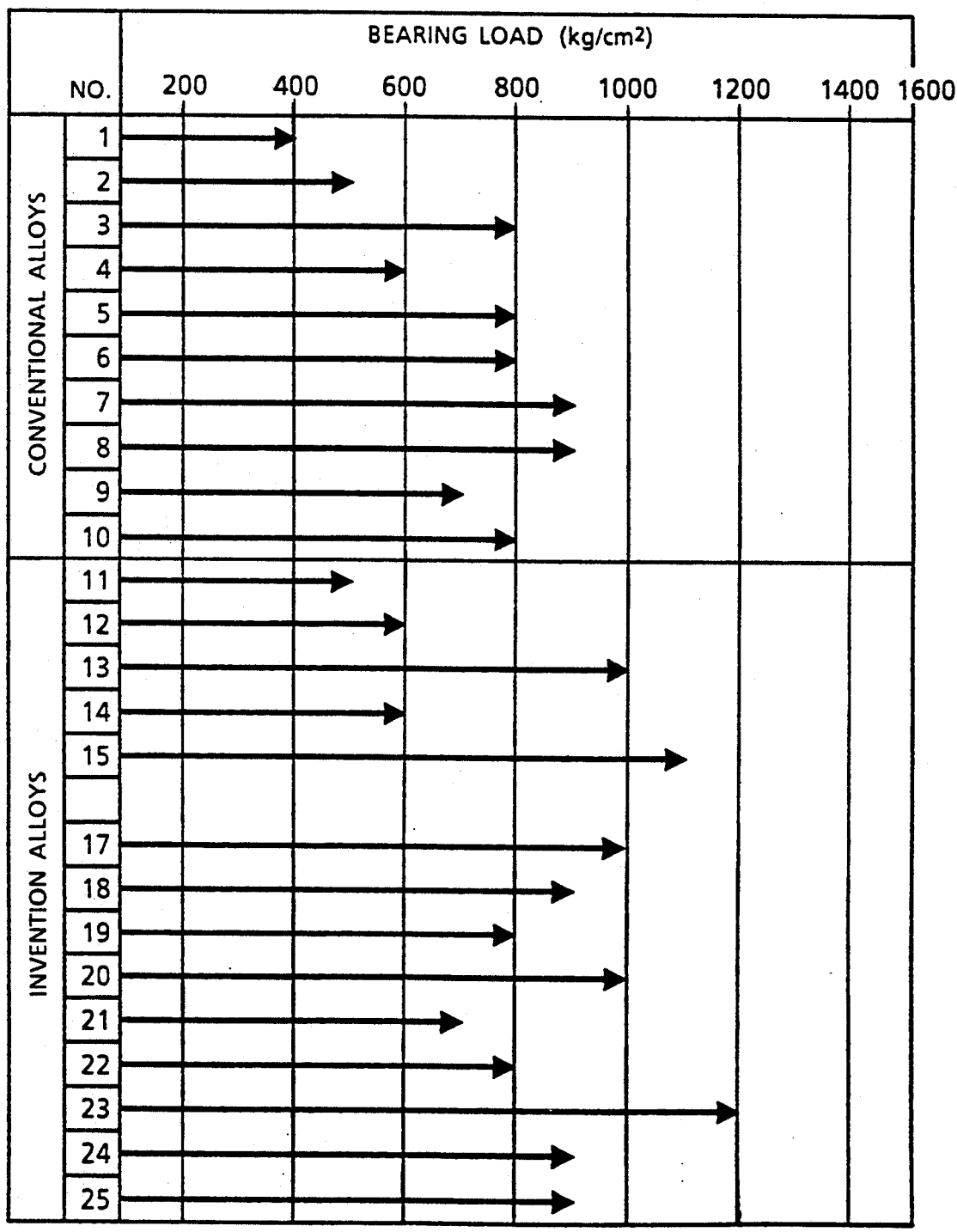
FIG. 3 is a graph showing the results of the seizure test made on a composite bearing, in which a cast iron shaft was used as a mating sliding member.

The results of the fatigue and seizure tests, which were effected on the composite bearings, are shown in FIGS. 1, 2 and 3, respectively.

The fatigue and seizure tests were conducted respectively under the conditions shown in Tables 2 to 4.

The seizure tests were effected by using the steel and cast-iron shafts respectively.

In this example, the aluminum intermediate layer was used. However, an intermediate layer of nickel may also be used.

From the results of the tests, it is apparent that the invention has the following advantages.

(1) The alloys of the present invention have an improved fatigue resistance comparing with the conventional alloys. Comparing the conventional alloys, sample Nos. 1 to 10, with the invention alloys, sample Nos. 11 to 20, which have the same compositions as that of the conventional alloys except for containing titanium and boron, it is clear that the fatigue strength of the invention alloys is improved by addition of titanium and boron. The invention alloys, sample Nos. 21 to 25, also exhibit excellent fatigue resistance.

(2) The alloys of the invention have an improved anti-seizure property comparing with the conventional alloys. Comparing sample Nos. 1 to 10 with sample Nos. 11 to 20, it is clear that the anti-seizure property of the invention alloys is improved. The invention alloys, sample Nos. 21 to 25, also exhibit excellent anti-seizure property.

(3) Generally speaking, the maximum seizure face pressure is lower in the seizure test which employs the case iron shaft than in the seizure test using the steel shaft. In the case of using the cast iron shaft, the alloys containing relatively much silicon have higher seizure resistance. This results from the polishing effect of silicon to projections or burrs on the surface of the case iron shaft, as stated above.

As will be apparent from the above, the invention alloys exhibit more excellent fatigue resistance and anti-seizure property than the conventional alloys.

TABLE 1

| | Sample No. | Chemical composition (% by weight) | | | | | | | | | | | | | |
|---|---|---|---|---|---|---|---|---|---|---|---|---|---|---|---|
| | | Al | Sn | Pb | Sb | Cu | Si | Mn | Ni | V | Mg | Zr | Cr | Fe | Ti | B |
| CONVEN- | 1 | balance | 6 | 0.1 | 0.5 | 4.0 | 0.5 | 0.5 | — | — | — | — | — | — | — | — |
| TIONAL | 2 | " | 6 | 0.5 | 0.5 | 4.0 | 1.5 | — | 0.5 | 0.5 | 0.5 | — | — | — | — | — |
| ALLOY | 3 | " | 10 | 1.0 | 0.3 | 1.0 | 2.5 | — | — | — | — | — | — | — | — | — |
| | 4 | " | 12 | 1.5 | 0.5 | 2.0 | 1.5 | — | — | 0.5 | — | — | — | — | — | — |
| | 5 | " | 17 | 2.0 | 2.0 | 3.0 | 2.5 | 0.5 | — | — | — | — | — | — | — | — |
| | 6 | " | 17 | 3.0 | 2.0 | 3.0 | 2.5 | — | — | 0.5 | — | — | — | — | — | — |
| | 7 | " | 17 | 4.0 | 2.0 | 1.0 | 2.5 | 0.3 | 1.0 | 0.5 | 0.3 | — | — | — | — | — |
| | 8 | " | 30 | 4.0 | 2.5 | 1.0 | 2.5 | 0.5 | — | — | — | — | — | — | — | — |
| | 9 | " | 30 | 7.0 | 2.5 | 1.0 | 0.5 | — | 0.5 | 0.5 | 0.5 | — | — | — | — | — |
| | 10 | " | 35 | 8.0 | 2.9 | 1.0 | 2.5 | 0.3 | 1.0 | 0.5 | 0.3 | — | — | — | — | — |
| INVENTION | 11 | " | 6 | 0.1 | 0.5 | 4.0 | 0.5 | 0.5 | — | — | — | — | — | — | 0.04 | 0.01 |
| ALLOY | 12 | " | 6 | 0.5 | 0.5 | 4.0 | 1.5 | — | 0.5 | 0.5 | 0.5 | — | — | — | 0.05 | 0.01 |
| | 13 | " | 10 | 1.0 | 0.3 | 1.0 | 2.5 | — | — | — | — | — | — | — | 0.15 | 0.03 |
| | 14 | " | 12 | 1.5 | 0.5 | 2.0 | 1.5 | — | — | 0.5 | — | — | — | — | 0.5 | 0.15 |
| | 15 | " | 17 | 2.0 | 2.0 | 3.0 | 2.5 | 0.5 | — | — | — | — | — | — | 0.3 | 0.10 |
| | 17 | " | 17 | 4.0 | 2.0 | 1.0 | 2.5 | 0.3 | 1.0 | 0.5 | 0.3 | — | — | — | 0.7 | 0.2 |
| | 18 | " | 30 | 4.0 | 2.5 | 1.0 | 2.5 | 0.5 | — | — | — | — | — | — | 0.2 | 0.04 |
| | 19 | " | 30 | 7.0 | 2.5 | 1.0 | 0.5 | — | 0.5 | 0.5 | 0.5 | — | — | — | 0.9 | 0.1 |
| | 20 | " | 35 | 8.0 | 2.9 | 1.0 | 2.5 | 0.3 | 1.0 | 0.5 | 0.3 | — | — | — | 0.2 | 0.07 |
| | 21 | " | 12 | 1.5 | 0.3 | 1.0 | — | — | — | — | — | — | — | — | 0.2 | 0.04 |
| | 22 | " | 10 | 2.0 | 0.5 | 2.0 | 0.1 | — | — | — | — | — | — | — | 0.05 | 0.01 |
| | 23 | " | 20 | 0.9 | 0.3 | 1.0 | 5.0 | — | — | — | — | — | — | — | 0.15 | 0.04 |
| | 24 | " | 10 | 1.0 | 1.0 | 1.0 | — | — | — | — | 0.5 | — | 0.1 | 0.2 | 0.1 | 0.02 |
| | 25 | " | 12 | 2.0 | 0.1 | 1.5 | — | — | — | — | — | 0.05 | — | — | 0.6 | 0.18 |

TABLE 2

| | Test Condition Fatigue Test |
| --- | --- |
| Test Machine | Dynamic Load Fatigue Testing Machine |
| Number of Rotation | 4,000 r.p.m. |
| Test Time | 20 Hrs. |
| Peripheral speed | 8.4 m/sec. |
| Feed Oil Temperature | 120° C. |
| Feed Oil Pressure | 3.0 kg/cm$^2$ |
| Lubricant Oil | #20 motor oil |

Evaluation of Test Results

Specimens were decided as developed fatigue when cracks generated on the sliding surface over 5% of area ratio to the entire sliding surface of the specimen bearings.

TABLE 3

| | Test Condition Seizure Test |
| --- | --- |
| Test Machine | Static Load Seizure Testing Machine |
| Number of Rotation | 2,000 r.p.m. |
| Test Time | the load increased by 50 kg/cm$^2$ step by step, 10 minutes for each load |
| Peripheral speed | 4.2 m/sec. |
| Feed Oil Temperature | 100° C. |
| Flow rate of Feed Oil | 20 cc/min. |
| Shaft Material | JIS S55C |

Evaluation of Test Results

Specimens were decided as developed seizure when the temperate of the bearing on the back surface exceeded 220° C. or when the current of the motor exceeded 20A.

TABLE 4

| | Test Condition Seizure Test |
| --- | --- |
| Test Machine | Static Load Seizure Testing Machine |
| Number of Rotation | 2,000 r.p.m. |
| Test Time | the load increased by 50 kg/cm$^2$ step by step, 10 minutes for each load |
| Peripheral speed | 4.2 m/sec. |

TABLE 4-continued

| | Test Condition Seizure Test |
| --- | --- |
| Feed Oil Temperature | 100° C. |
| Flow rate of Feed Oil | 20 cc/min. |
| Shaft Material | JIS FCD70 |

Evaluation of Test Results

Specimens were decided as developed seizure when the temperature of the bearing on the back surface extended 220° C. or when the current of the motor exceeded 20A.

What is claimed is:

1. An aluminum-based bearing alloy comprising: 3–40% Sn, 0.1–10% Pb, 0.1–5% Cu, 0.1–3% Sb, total 0.05–1% of Ti and B, percent by weight, which satisfy the equation $\frac{Ti+B}{B}=0.1$ to 0.35, and the balance being essentially Al.

2. The aluminum-based bearing alloy according to claim 1, further comprising 0.1–5% Si.

3. The aluminum-based bearing alloy according to claim 1, further comprising total 0.01–3% of at least one element selected from the group consisting of Mg, Ni, V, Mn, Zr, Cr and Fe.

4. The aluminum-based bearing alloy according to claim 1, further comprising 0.1–5% Si and total 0.01–3% of at least one element selected from the group consisting of Mg, Ni, V, Mn, Zr, Cr and Fe.

5. A composite sliding bearing comprising a sliding surface layer and a backing metal layer, the sliding surface layer being made of the alloy defined in claim 1.

6. A composite sliding bearing according to claim 5 wherein the backing metal is steel.

7. A composite sliding bearing comprising a sliding surface layer and a backing layer, the sliding surface layer being made of the alloy of claim 2.

8. A composite sliding bearing according to claim 7 wherein the backing metal is steel.

9. A composite sliding bearing comprising a sliding surface layer and a backing layer, the sliding surface layer being made of the alloy of claim 3.

10. A composite sliding bearing according to claim 9 wherein the backing metal is steel.

11. A composite sliding bearing comprising a sliding surface layer and a backing layer, the sliding surface layer being made of the alloy of claim 4.

12. A composite sliding bearing according to claim 11 wherein the backing metal is steel.

* * * * *

UNITED STATES PATENT AND TRADEMARK OFFICE
CERTIFICATE OF CORRECTION

PATENT NO. : 5,162,100
DATED : Nov. 10, 1992
INVENTOR(S) : TANAKA et al.

It is certified that error appears in the above-identified patent and that said Letters Patent is hereby corrected as shown below:

Title Page:

Column 2, Line 4 of the Abstract, delete "B/Ti+B" and insert therefore --B/[Ti + B]--;

Column 1, Line 41, delete "$\frac{B}{Ti+B}$ = 1 to 0.35" and insert therefore --B/[Ti + B] = 0.1 to 0.35--

Column 2, Line 45, delete "$\frac{B}{Ti+B}$" and insert therefore --B/[Ti + B]--;

Column 2, Line 58, delete "$\frac{B}{Ti+B}$" and insert therefore --B/[Ti + B]--;

Column 2, Line 60, delete "$\frac{B}{Ti+B}$" and insert therefore --B/[Ti + B]--;

Column 6, Claim 1, Line 4, delete "$\frac{B}{Ti+B}$" and insert therefore --B/[Ti + B]--;

Signed and Sealed this

First Day of February, 1994

Attest:

Attesting Officer

BRUCE LEHMAN

Commissioner of Patents and Trademarks